United States Patent

Corbett et al.

[11] 4,087,036
[45] May 2, 1978

[54] FRICTION WELDING METHOD AND APPARATUS

[75] Inventors: David A. Corbett, Akron; Frederick E. Clark, Canton, both of Ohio

[73] Assignee: Pemtec, Inc., Greensburg, Pa.

[21] Appl. No.: 732,521

[22] Filed: Oct. 14, 1976

[51] Int. Cl.² .............................................. B23K 19/02
[52] U.S. Cl. .................................... 228/102; 228/112; 228/2; 228/9
[58] Field of Search ................. 228/2, 9, 12, 102, 103, 228/112, 114

[56] References Cited

U.S. PATENT DOCUMENTS

| 3,455,494 | 7/1969 | Stamm | 228/2 |
| 3,678,566 | 7/1972 | Ellis et al. | 228/102 |

FOREIGN PATENT DOCUMENTS

| 390,885 | 11/1973 | U.S.S.R. | 228/112 |

Primary Examiner—Al Lawrence Smith
Assistant Examiner—K. J. Ramsey
Attorney, Agent, or Firm—Buell, Blenko & Ziesenheim

[57] ABSTRACT

A friction welding method and apparatus which monitors temperatures at the interface of ferrous and nonferrous metal products being welded and provides controls for insuring satisfactory welds and also provides automatic means of verification thereof as well as rejection of unsatisfactory welds. Light-sensing means is utilized to detect acceptable welding temperatures at the weld interface for initiating and controlling the welding or forging interval and application of forging pressures. Visible signal means is provided for indicating a faulty weld and mandatory operation of manual means is required for release of faulty welds. Automatic controls in the form of fluid pressure logic circuitry provides necessary interlocks and sequences of operation.

20 Claims, 8 Drawing Figures

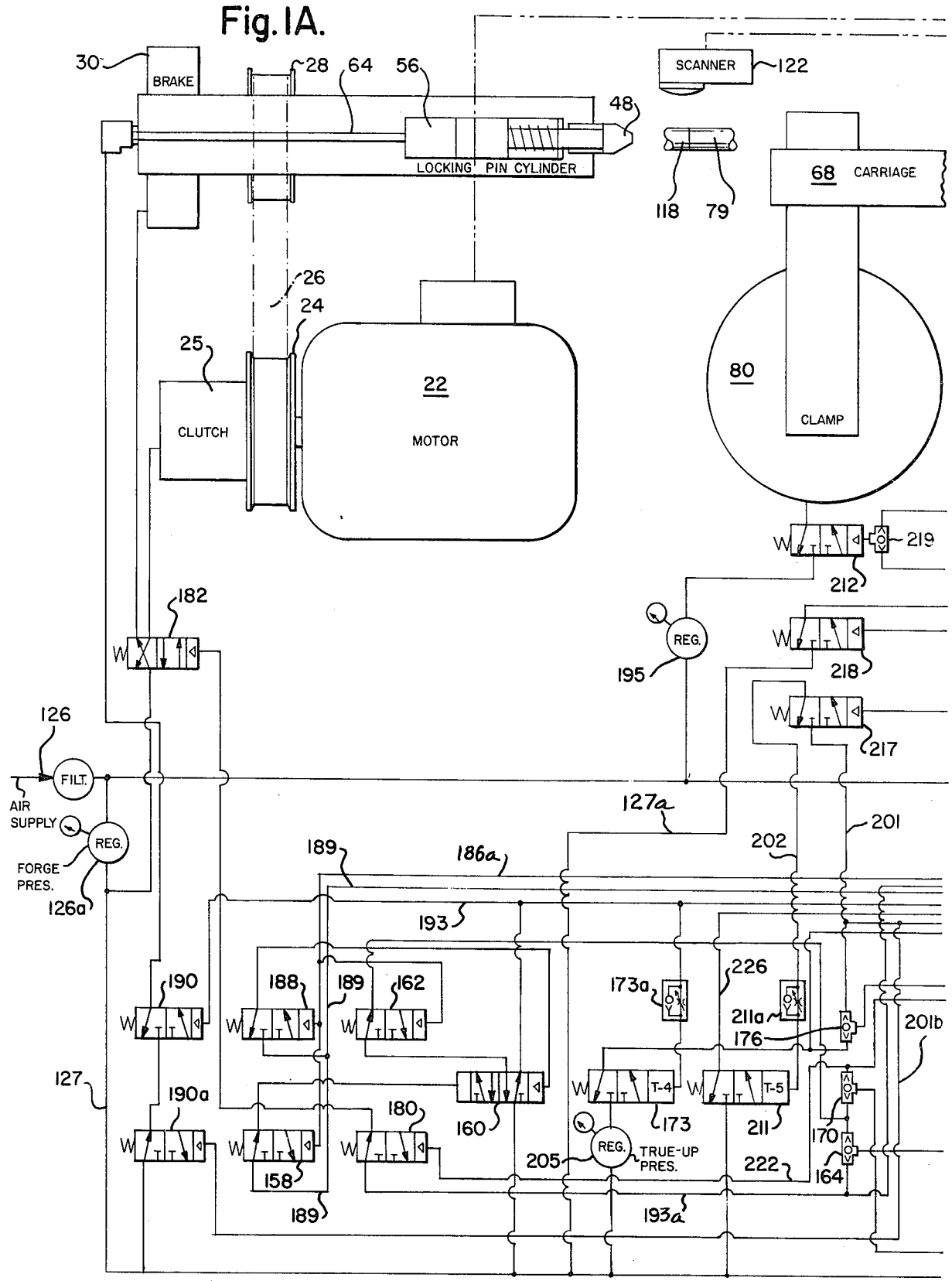

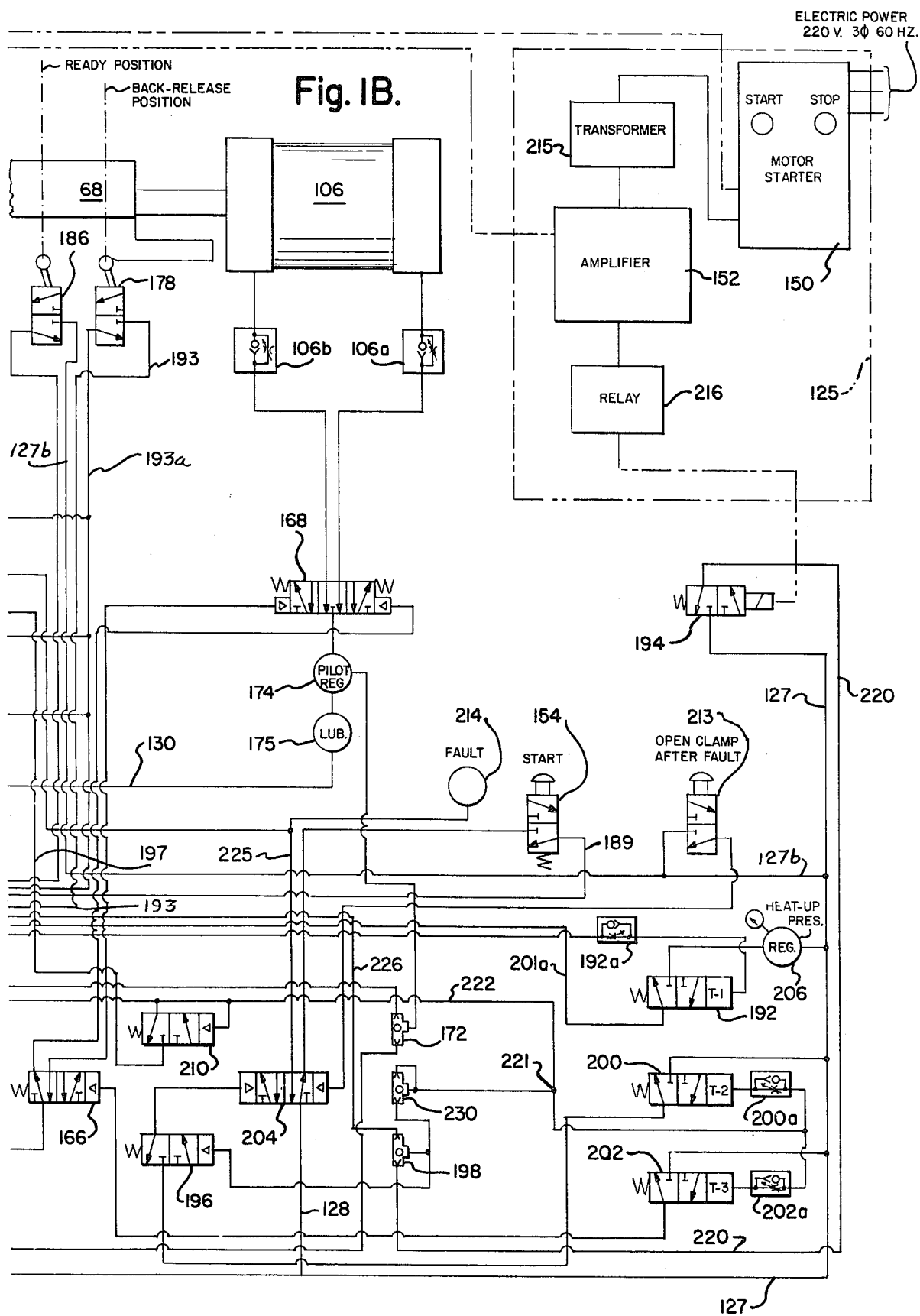

FRICTION WELDING METHOD AND APPARATUS

This invention relates to friction welding apparatus and methods which monitor and control the quality of the weld by means of apparatus measuring energy input in terms of temperatures at the welding interface. The invention utilizes light-responsive means, such as a photocell, for detecting and measuring temperatures at a weld interface, the light emission being a measure of the temperatures at the weld.

Friction welding methods and apparatus are well known and various methods are resorted to to determine the parameters of welding temperatures to provide an acceptable weld. For example, in U.S. Pat. No. 3,678,566, issued July 25, 1972, the rate of axial shortening of the work pieces due to burn-off during the relative rotation under axial pressure is measured and used as a guide for the quality of the weld. In certain forging operations, such as in forging fluid type tension indicating bolts of the type more recently employed in mining roof support, the heat affected zone becomes very critical and must be restricted.

It is the purpose of this invention to provide a means and method whereby to sense the energy input in terms of temperature, time and position of products being welded so as to provide reliably and with assurance an acceptable weld by the friction welding process for such types of applications.

In furtherance of the objectives of the invention we provide apparatus for disposing two members such as a bolt-stub and a threaded bolt in coaxial relation and means for bringing the two parts into end to end frictional relation while rotating one of the members, preferably the bolt-stub. We also provide a light-responsive means for measuring the temperature at the interface of the weld which monitors and controls automatically through pneumatic circuitry the rotation of the bolt-stub and the application of forging pressures.

We further provide means for giving visible indication of a faulty weld.

We further provide means for preventing the removal of the parts from the apparatus except by supplemental overriding manual operation, if the weld is unacceptable.

A preferred embodiment of our invention is described hereinafter in detail in connection with the accompanying drawings wherein:

FIGS. 1A and 1B, when placed together in side by side relation are a diagrammatic view of the apparatus and control circuitry embodying our invention;

Figure 2:
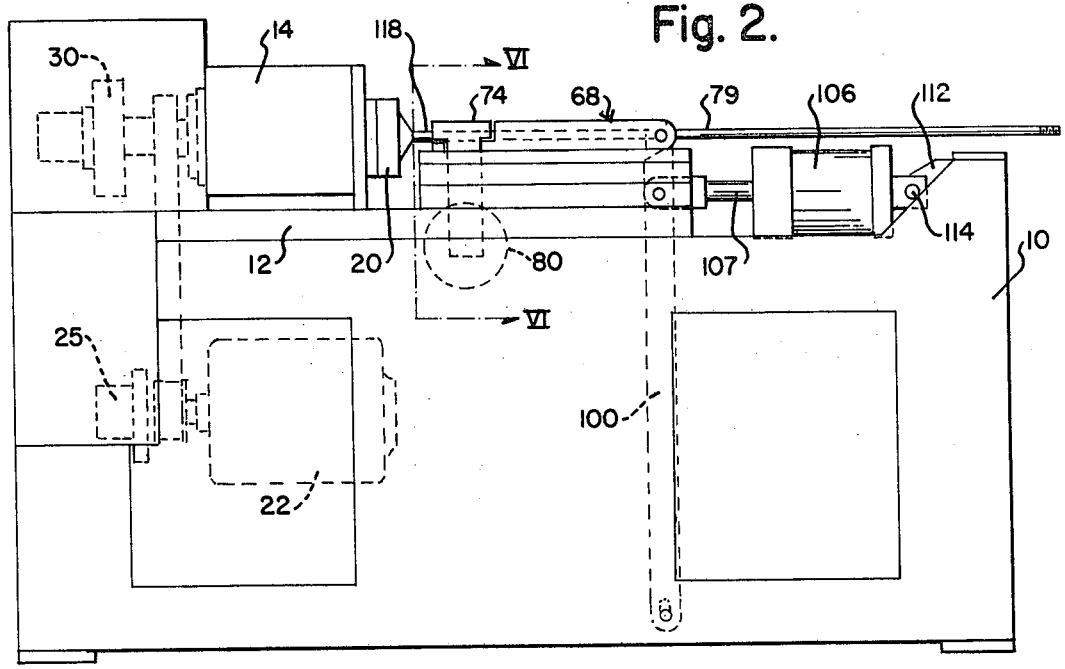
FIGS. 2 and 3 are respectively side elevational and plan views of the friction welding assembly.

Referring to the drawings, particularly FIGS. 2-6, the friction welding assembly comprises a support frame comprising base or bed plate 10, a mounting plate 12, a head stock 14, having therein a rotary spindle 16 supported by longitudinally spaced bearings 18. The spindle is adapted to be driven by a motor 22 via a belt 26 and associated pulleys 24 and 28 mounted on the motor shaft and on the spindle respectively. Associated with the motor shaft is a pneumatically controlled clutch 25 and associated with the external extension of the spindle 16 is a pneumatically controlled brake 30.

Attached to the end of the spindle opposite the brake is a chuck 20. The chuck 20 contains a diametrical rectangular cavity 36 in which a pair of cooperating jaws 34 are pivotally mounted on transversely extending pins 38. The jaws 34 are provided with mating semi-circular grooves 42 which together provide a bore 44 coaxial to the spindle. The bore 44 extends inwardly to a square opening 40 extending transversely through the jaws. As will be apparent later, the jaws are thus designed for holding a bolt-stub in coaxial relation to the spindle. At the back of the jaws 34 are cooperating inclined surfaces 46 which provide a v-shaped recess when the jaws are in closed position.

Slidably mounted in a rectangular recess 62 in the spindle is a correspondingly sized wedge member 48 having a tongue which is adapted to be moved axially into co-acting interposition with the inclined surfaces 46 on the jaws to lock the jaws in closed position. The wedge member is carried on the end of a piston rod 52 of a piston 54 which operates in a cylindrical bore 56 within the spindle 16. A passage 64 opening into the end of the cylindrical bore is provided through which fluid pressure, such as compressed air, may be supplied to act on piston 54 to move the wedge member 48 into locking position. A coil spring 65 is interposed between the piston 54 and the cylinder head or end bearing 58 for the piston rod to bias the wedge member to its unlocking position.

The assembly further comprises a carriage 68 having a plate 69 slidable in a guide 70 comprising two laterally spaced oppositely facing channel members secured as by welding to the mounting plate 12. The carriage further comprises two laterally spaced members 71 extending in parallel relation perpendicularly to the carriage plate 69. At one end, the members 71 project beyond the carriage plate and are pivotally connected to a vertically extending lever 100. The top end of the lever 100 has a cross-arm carrying two clevises in spaced relation which are respectively connected to the ends of members 71 by pins 104.

A double acting cylinder 106 having a piston and piston rod 107 is provided for attachment to the lever 100 via a clevis 108 and pin 110. The lowermost end of the lever 100 is anchored to the bottom of the support frame or base 10 by a pin which extends through an elongated slot in the lever. The piston rod 107 is attached to the lever 100 at a point relatively close to the clevis pins 104. Upon introduction of compressed air into the cylinder at the right-hand side of the piston, the piston moves to the left (FIG. 4) and rocks the lever 100 in a counterclockwise direction to slide the carriage 68 toward the spindle 16.

Interposed between the members 71 and secured thereto is a bridging member 73, (FIG. 3) the upper surface of which is in the form of a shallow V. Member 73 serves as a support for a member to be welded, such as a threaded rod, as hereinafter explained. In the carriage plate at the opposite end from the lever arm 100 is a square opening 75. Straddling the opening 75 and secured in parallel spaced relation as by welding to the carriage plate are a pair of members 76. Members 76 are notched in the center to receive a longitudinally extending member 72 provided with a V-groove in registry with the V-shaped edge on the bridging member 73. Together, members 72 and 73 constitute means for support of a member to be welded, such as a threaded rod 79, as shown in FIG. 2.

Pivotably mounted between the members 76 on pins 78 are a pair of clamping jaws or levers 74. The levers 74 are normally in substantially vertical position and are adapted to have the lower ends rocked simultaneously outwardly from the vertical by a bellows 80 through intervening bellows mounting plates 82. The upper ends of the levers 74 are knurled to provide gripping surfaces for gripping the threaded rod 79 resting in the member 72 from opposite sides as the bellows 80 is expanded.

In order to ensure symmetrical rocking of the clamping levers 74 the mounting plates for the bellows are connected through a pair of links 84, which are pivotally attached thereto by pins 92. The two links are coupled together centrally of the bellows by a pin carrying a cam roller 86 at one side of the plane of the links 84. The cam roller 86 rides in a vertically extending cam slot 88 which is provided in a cam guide member 90. The guide member 90 is in the form of an angle bracket attached to the bottom of the carriage plate. It will be apparent that the bellows 80 and the clamping levers 74 are carried entirely by the carriage plate 69 and move therewith.

Figure 3:
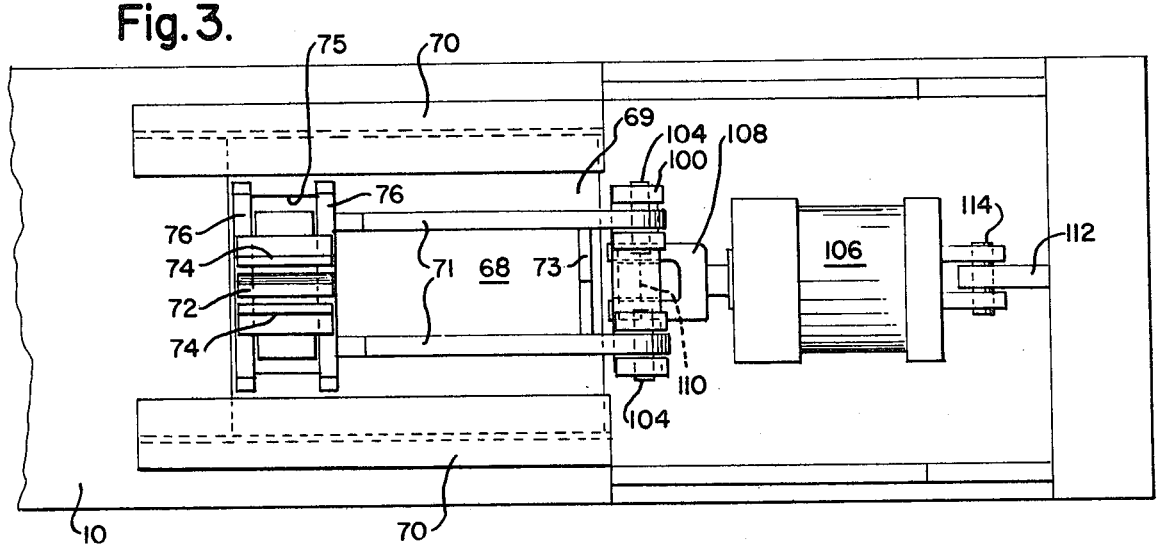
Figure 6:
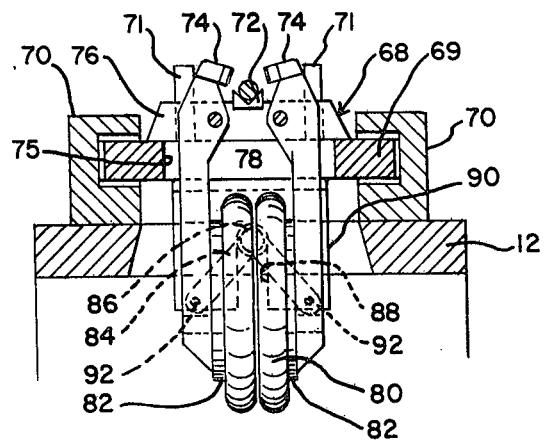
FIG. 6 is a transverse sectional view taken on the line VI—VI of FIG. 2.
Figure 4:
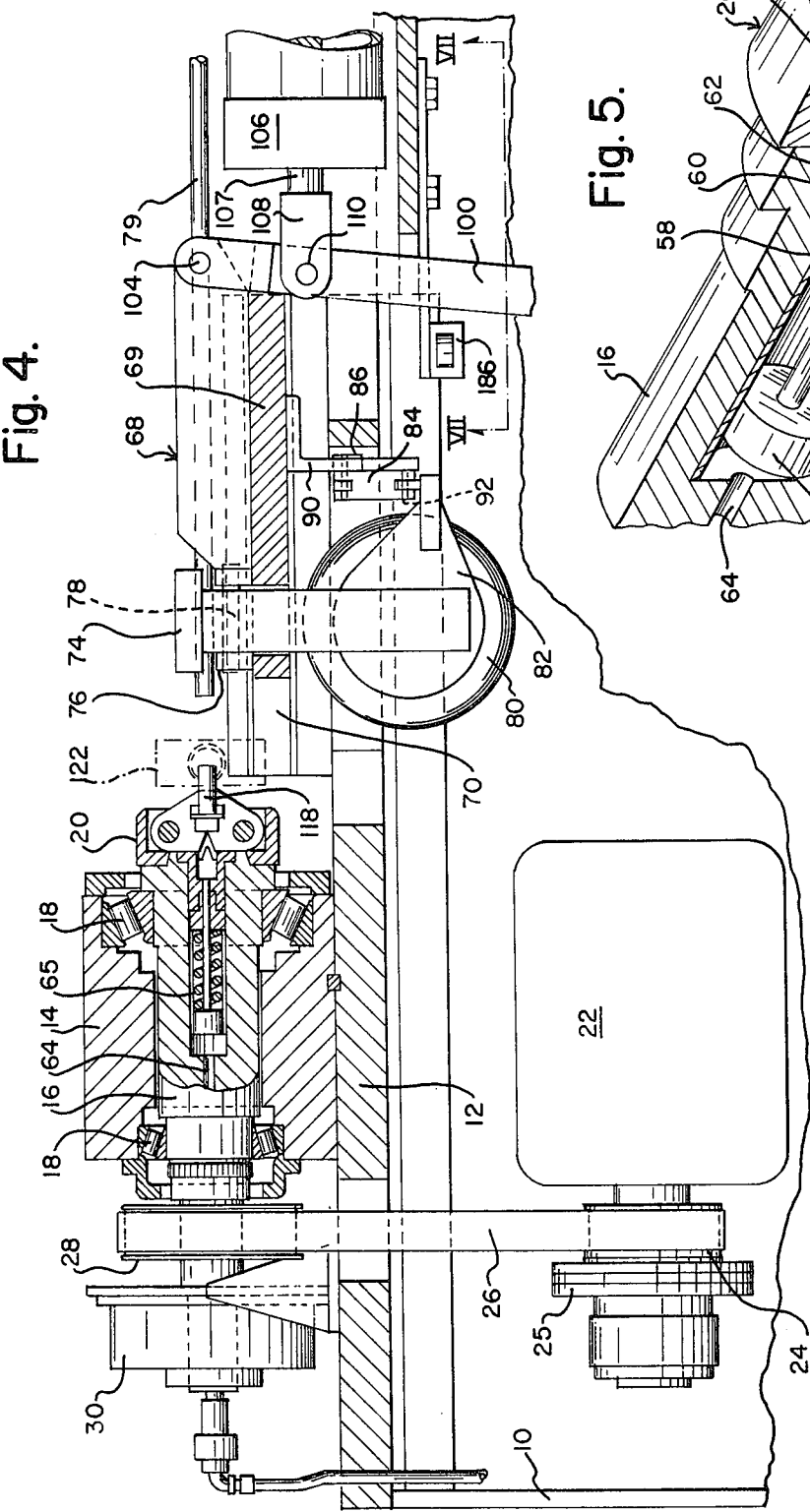
FIG. 4 is a side elevational view of the friction welding assembly in somewhat greater detail and on enlarged scale.
Figure 5:
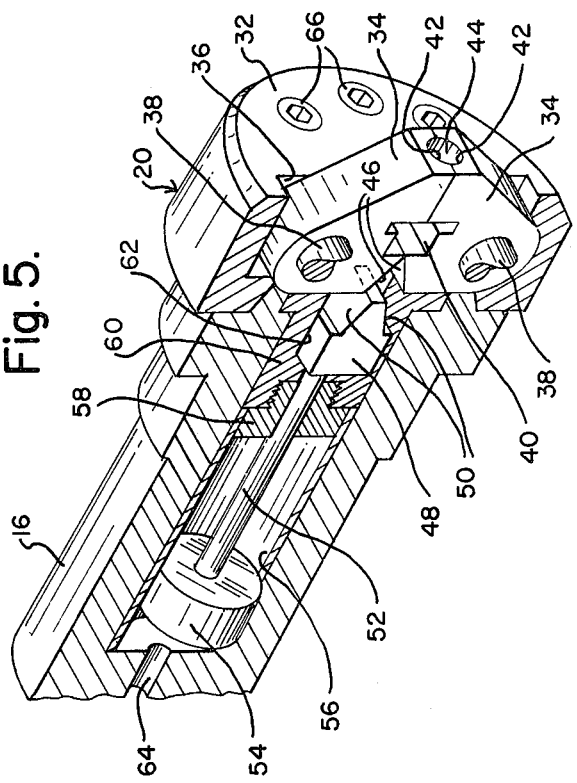
FIG. 5 is a partial isometric sectional view of the spindle, chuck and jaw locking means of FIG. 4.

As shown in FIGS. 2 and 3, the cylinder 106 has a cylinder head with a clevis by which the cylinder is anchored to a mounting tab 112 on the base 10 as by a pin 114. It will be apparent that when compressed air is supplied to the right-hand side of the piston in the cylinder 106, the piston will shift the carriage plate 69 and the threaded rod 79, which is clamped to the carriage plate, into end-to-end contact with a member, such as a square head bolt stub 118, clamped in the jaws 34 of the chuck 20. As will be explained further in more detail, movement of the carriage 68 by the cylinder 106 to an initial position in its movement toward the spindle is designated the "back release" position, indicated in FIG. 1B. A second position of the carrage, which is essentially the position of initial contact of the threaded rod 79 with the bolt stub 118, is designated the "ready" position also, shown in FIG. 1B.

Referring now to FIGS. 1A and 1B, additional parts of the assembly and apparatus are shown. An electrical control center 125, shown in block form is provided to which electrical power is fed. The electrical power may be in the form of a three phase, 220 volt, 60 cycle supply. For controlling the electric motor 22 a suitable motor starter 150 is provided having a "start" button and a "stop" button. The electrical connections from the control center to the motor 22 are indicated by broken lines.

Also provided, as a particular feature of my invention, is a light sensitive device 122 of the type suited for measurement of temperature at the interface between members to be welded, such as the bolt stub 118 and the threaded rod 179. The device 122 may be a commercial product such as Warner Scanner No. MCS628 with 8099-007 Auxiliary Lense. (See Warner Electric Brake and Clutch Co., Beloit, Wis. 53511 publication P-241-30 Rev. 7/75)

The control center 125 also includes additional apparatus, such as a transformer 215, (e.g. G.E. No. 769G 220/110) an amplifier 152 (e.g. Warner Visolux No. MCS148) and a relay device 216 (e.g. Warner Relay No. MCS-814). This equipment functions in connection with the device 122, as shown by the broken lines, whereby when a pre-set welding temperature is registered by the device 122, an energizing circuit is established from the relay 216 to a solenoid-operated two-position valve 194, the function of which will be explained hereafter.

Additional parts of the control system will be described in connection with an assumed operation which follows. At the outset it should be understood that the control center 125 is activated by connection of a supply of electrical power and that a suitable supply or source 126 of fluid under pressure, hereafter referred to as compressed air, is provided. In addition, it is assumed that the "start" button of the motor starter 150 has been operated and that the motor 22 is rotating; also that the scanner device 122 has been activated.

It will be understood also that, with the cylinder 106 deactivated, the carriage 68 will be in its "back release" position indicated by the legend. As will become apparent more fully later on, the brake 30 on the spindle 16 is in applied position and the clutch 25 associated with motor 22 is disengaged, under control of a two-position valve 182. As shown, valve 182 is in a position to supply air under pressure from the source 126, via a pressure regulator 126a, at a pressure of for example 100 lbs. p.s.i. to the brake 30 to effect application thereof. At the same time, valve 182 releases air under pressure from the clutch 25 to effect disengagement thereof. Thus, it will be understood that, under these starting conditions, while the motor 22 is rotating the spindle 16 is not rotating.

Let it now be further assumed that the operator installs a bolt stub in the jaws 34 of chuck 20 with the head within the square opening and the shank extending out through the bore 44. The jaws 34 may be separated for this purpose, as the supply of air pressure to the cylinder 56 of the wedge member 48 is cut off at this time for reasons later explained.

The operator now initiates further operation by depressing a start valve 154. Valve 154 is a two-position valve biased to a normal position by a spring and activated to an operative position by application of manual pressure on a plunger head. With valve 154 in depressed position, compressed air is supplied from the regulator 126a, via line 127, branch line 128 through a two-position valve 204 to the start valve 154, thence via a line 189 to a two-position valve 158, and via the valve 158 to the left-hand pressure chamber of a floating type two-position valve 160. The valve element of valve 160 is pressure pulse activated in opposite directions by compressed air acting on opposite ends to either of two valve positions. No movement of the valve element occurs except and unless a momentary or constant end pressure is applied thereto.

Valve 160 is thus shifted to a right-hand position responsively to the pressure pulse on the left-hand end thereof where it remains until activated oppositely. With the valve 160 in its right-hand position, compressed air from line 127 is supplied through valve 160 to a valve 162. Valve 162 is a simple two-position valve biased to a normal (right-hand) position by a spring and activated oppositely to a left-hand position by a pressure pulse active on the right-hand end thereof. With valve 162 in its normal position, compressed air flows through the valve to a juncture between two double check valves 170 and 164.

From the juncture, compressed air flows via check valve 164 to a valve 166 and through valve 166 in its normal position to the right-hand end of a directional control valve 168 for cylinder 106. Valve 168 has a three-position valve element having a central normal position and a right-hand and left-hand position on opposite sides of the normal position. The valve element of this valve is biased to the normal position by oppositely acting springs and activated to the right-hand and left-hand positions by air pressure acting on opposite ends. With air pressure supplied to the right-hand end of the valve 168, the valve element thereof is shifted to its left-hand position in which compressed air flows directly from the air supply 126 via a line 130 to a so-called pilot regulator 174, which in turn supplies compressed air at a controlled pressure to the right-hand side of the double-acting piston (not shown) of cylinder 106. A conventional lubricator 175 in series in the line 130 supplies lubrication to the piston in the cylinder.

From the juncture referred to previously, compressed air also flows via check valve 170, through a connecting line to another double check valve 172, and thence via a connecting line to the control chamber of pilot regulator 174. Regulator 174 is of the type that supplies air at a pressure corresponding to the pressure in a control chamber. It will thus be seen that with the control chamber of the pilot regulator 174 charged with compressed air at the pressure in line 127, as controlled by regulator 126a, the pilot regulator 174 supplies compressed air at a pressure corresponding to, that is equal to, the pressure delivered by the regulator 126a to line 127, namely about 100 lbs./p.s.i.

With the directional valve 168 activated to its left-hand position by the pressure acting on the right-hand end, compressed air flows through the valve 168 to the cylinder 106, as before described, at the pressure of the control pressure acting on the pilot regulator 174.

The supply line from valve 168 to the cylinder 106 contains a combined ball check and adjustable choke valve element 106a. The choke meters the exhaust of compressed air from the cylinder on the return stroke of the piston to prevent a "slamming" action. The ball check unseats to permit unrestricted supply to the cylinder 106.

The chamber on the opposite side of the piston in cylinder 106 is similarly supplied with compressed air under control of directional valve 168 to effect a return stroke of the piston, as later explained. A combined ball check and choke 106b in the line from valve 168 performs a similar function to that of the combined ball check and choke 106a.

The piston in the cylinder 106 moves in the left-hand direction responsively to the compressed air pressure supplied via valve 168 to the right-hand side of the piston and thereby shifts the carriage 68 correspondingly via the lever 100. The shifting of lever 100 through an angle effects operation of two so-called toggle-valves 178 and 186 (FIG. 1B) in succession.

Figure 7:
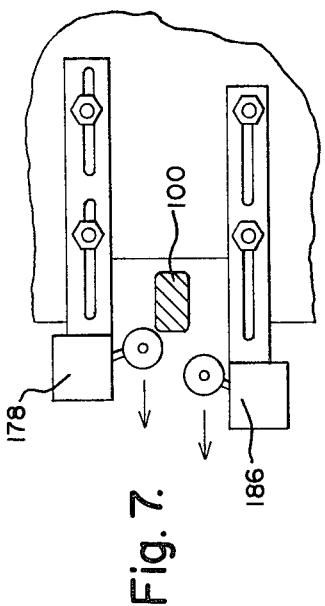
FIG. 7 is a sectional view taken on the line VII—VII of FIG. 4.

The valve element of each of these valves has two positions. The valve element is spring-biased to a normal position and activated to the second position by pressure of lever 100 on a toggle lever. As shown in FIG. 7, the toggle lever of these valves has a roller on the end thereof which is moved laterally, in the direction shown by the arrows, by the lever 100 as the lever 100 engages the roller. The lateral movement of the toggle lever shifts the valve element to its activated position.

While valve 178 is shifted to its activated position, no response occurs thereto at the time. However when valve 186 is activated, compressed air from line 127 is supplied therethrough and via a line 186a to the right-hand end of three valves 162, 158 and 188. These valves are similar in that the valve element thereof has two-positions, a normal position to which the element is spring-biased, and a second position to which the element is activated by air pressure acting on the right-hand end thereof.

In its second position, valve 162 cuts off the supply of compressed air from valve 160 to the juncture of check valves 170 and 164 and vents the line leading to the juncture of the two check valves. Accordingly the air pressure acting on the right-hand end of directional valve 168 is relieved and, at the same time the air pressure acting in the control chamber of pilot regulator 174 is released. Thus directional valve 168 is automatically restored to its central position in which the compressed air acting on the right-hand side of the piston in cylinder 106 is vented to atmosphere, and in which the supply thereto of compressed air via the pilot regulator 174 is cut off.

It will be seen, therefore, that the movement of the piston in cylinder 106 is instantly stopped when valve 186 is activated.

Valve 158 is activated to its left-hand position by the compressed air acting on the right-hand end thereof, in which position it vents the left-hand end of valve 160. At the same time, valve 188 is shifted to its left-hand position by the compressed air acting on the right-hand end thereof. However, since the line 189 is no longer subject to the pressure of air as supplied through start valve 154, since the valve 154 was operated only momentarily and released promptly, the shift of valve 188 to its left-hand position is of no consequence at this time. It is to be noted, however, that valve 188 remains in its left-hand position in which line 189 (from the start valve 154) is in communication with the right-hand end of valve 160, for a purpose later made apparent.

In its right-hand position in which it remains at this time, valve 160 vents compressed air from the line 193 leading to the control chamber at the right-hand end of valve 190. Consequently the valve 190 is spring biased to its right-hand position in which it vents the chamber 56 controlling the locking wedge 48. Thus the jaws 34 of the chuck are not yet locked.

At this time, with the carriage stopped in its READY position, the operator places a threaded rod 79 in the carriage 68 in coaxial alignment and in end-to-end contact relation to the bolt stub 118, following which he depresses the start valve 154 a second time and maintains it depressed for a short interval of time.

The depression of start valve 154 a second time, causes compressed air from supply line 127 and branch line 128 to be supplied via valve 154 to line 189. With valve 188 biased to its left-hand position, as before described by air pressure supplied via valve 186 and line 186a, the compressed air from line 189 flows via valve 188 to the control chamber at the right-hand end of valve 160, which, as before described, remained in its right-hand position. Valve 160 is accordingly activated to its left-hand position (valve 158 being in position to vent the control chamber at the left-hand end of valve 160) in which compressed air is supplied via valve 160 to line 193.

The compressed air supplied to line 193 flows to the control chamber at the right-hand end of valve 190, to the control chamber at the right-hand end of a valve 173, and to valve 178.

Valve 190 is thus activated to its left-hand position in which compressed air is supplied therethrough from line 127, via valve 190a in its right-hand position, to the chamber 56 of the locking wedge 48, which is thereby shifted into locking position locking the jaws 34 of chuck 20 on the bolt stub 118 to hold it firm. At the same time, compressed air flows from charged line 193 via activated valve 178 to a line 193a, from which it flows to the right-hand end of each of three valves 212, 217, 218, as well as of valve 182 thus activating them to their left-hand position. For a reason which will later appear, a double check valve 219 is interposed in the branch line from line 193a to valve 212 through which the compressed air flows.

Valves 212, 217 and 218 are identical in construction, each having a two-position valve element which is spring-biased to a normal (right-hand) position and which is activated to a left-hand or activated position by compressed air acting in a control chamber on the right-hand end of the valve element.

Valve 212 in its activated position supplies compressed air therethrough from air supply 126, at a pressure controlled by a regulator 195 to the bellows or air bag 80 of carriage 68. The jaws of clamping levers 74 are thereby activated into clamping position holding threaded rod 79 firmly in end-to-end coaxial relation with the bolt stub 118.

Valve 218, in its activated (left-hand) position supplies compressed air from the line 127, via a branch line 127a, to a line 197 leading to a blocked port of a valve 210. Valve 210 has a two-position valve element which is spring-biased to a normal (right-hand) position and which is activated in a left-hand direction, by compressed air acting in a control chamber on the right-hand end of the valve element, to an activated (left-hand) position. In its present normal position valve 210 blocks flow of compressed air beyond or through the valve.

Valve 217, in its activated position, establishes a connection from a line 201 (not yet pressurized) to a line 202 leading to the control chamber at the right-hand end of a valve 211, later to be described.

Compressed air supplied to line 193a by valve 178, as before described, also flows via valve 180 to the right-hand end of valve 182, to thereby activate it to its left-hand position, in which compressed air is released from the brake 30 on the spindle 16 and is supplied to the clutch 25 of the motor 22. At this time, therefore, the brake on the spindle is released and the motor clutch is engaged. Thus, spindle 16 and the bolt stub 118 in the chuck 20 are instantly rotated at an appropriate speed corresponding to the motor speed.

Compressed air supplied to line 194 by valve 178 also flows through the lower end of the double check valve 164 and through valve 166 to the control chamber at the right-hand end of directional valve 168, which is thus activated to its left-hand position in which compressed air is supplied from the pilot regulator 174 to the chamber at the right-hand side of the piston in cylinder 106. As will presently appear, pilot regulator 174 is conditioned to supply a so-called "true-up" pressure to the cylinder 106. The force thereby exerted by the piston pressing the end of threaded rod 79 against the end of the bolt stub 118 is such as to produce an appropriate plane mating face contact between the two elements to be welded together.

The valves 173 and 211 are similar in that each has a valve element spring-biased to a normal (right-hand) position and shifted to an activated (left-hand) position by compressed air acting in a control chamber on the right-hand end of the valve element. Also, each valve has built therein, though shown separately for convenience, a ball check valve and choke device 173a and 211a respectively. The ball check valve seats upon supply of compressed air to the control chamber, thereby metering the rate of flow of the compressed air to the control chamber through the choke. The valves 173 and 211 are thus time-delay activated, the time delays being different for the two valves. The time delay, identified by the symbol T-4 on valve 173, refers to the time sufficient to build up pressure in the bellows 80 for activating the clamping levers 74 into clamping position. The time delay identified by the symbol T-5 on valve 211 is a somewhat longer interval of time, as will later appear.

The valves 173 and 211 may be purchased as commercial items, such as Festo valves (Publication 4407/704/155 BD).

Returning now to the charging of the line 193 by the valve 160, as previously stated, compressed air is thus supplied from line 193 to the control chamber at the right-hand end of valve 173. After the clamping levers 74 are in clamping position on threaded rod 79, the time delay T-4 expires and valve 173 is shifted to its activated position. In its activated position, valve 173 supplies compressed air from line 127, at a pressure determined by the adjustment of a regulator 205, successively through double check valves 176 and 172 to the control chamber of the pilot regulator 174. Thus the pressure of the compressed air supplied by the regulator 205 corresponds to the "true-up" pressure previously referred to, which determines the pressure of compressed air presently being supplied to the cylinder 106. It may be, for example, of the order of 30 p.s.i.

In its activated position, valve 173 also supplies compressed air, at the "true-up" pressure to a control chamber at the right-hand end of a valve 192. Valve 192 has a two position valve element that is spring biased to a normal (right-hand) position and shifted by pressure acting in a control chamber at its right-hand end to its activated (left-hand) position. Like valves 173 and 211, valve 192 is a "time-delay" activated valve. For this purpose a ball-check valve and choke device 192a is built into the valve structure, though shown separately for convenience. After the expiration of the time delay period, identified as T-1 on the valve, valve 192 is shifted to its activated (left-hand) position in which compressed air is supplied from line 127, at a pressure determined by the adjustment of a regulator 206, such as 50 lbs. p.s.i., to line 201 via a branch line 201a. This pressure is referred to hereafter as the "heat-up" pressure.

With valve 217 held in its activated position, compressed air from line 201 flows to line 202 and to the control chamber of valve 211, via the check valve and choke device 211a. Being a time delay valve, valve 211 is not immediately shifted to its activated (left-hand) position.

From line 201, compressed air at "heat-up" pressure flows through the upper port of double check valve 176 (overcoming the "true-up" pressure being supplied through the lower port) and upper port of double check valve 172 to the control chamber of pilot regulator 174. With the increase in the control pressure from "true-up" to "heat-up" pressure, pilot regulator 174 supplies compressed air at a correspondingly increased pressure to the right-hand side of the piston in cylinder 106. The force with which the piston presses the threaded rod to the bolt stub is thus correspondingly increased to effect the "heat-up" of the parts being welded at the interface thereof.

At this same time compressed air flows from the line 201a via a line 201b to the right-hand end of valve 190a, thereby causing the valve element thereof to be shifted to its activated (left-hand) position in which it causes venting of compressed air from the chamber 56 holding the locking wedge 48 in locking position. It will be understood that this does not open the jaws of chuck 20 but merely makes it possible to remove the bolt stub later on after the welding operation is completed.

Assume now that the scanner 122 senses a pre-set temperature at the zone adjacent the interface of the two parts 118 and 79, being welded, which has previously been determined to be appropriate for proper welding. At such instant, the scanner transmits a signal to the control center 125, where amplifier 153 relays it to relay 216 from which an energizing current is supplied to the solenoid of the solenoid operated valve 194.

Upon energization of valve 194, the valve element thereof is shifted to its activated (left-hand) position, in which compressed air from line 127 is supplied to a line 220.

The compressed air from line 220 flows through the lower port of a double check valve 198 to the control chamber at the right-hand end of a valve 196. Like other two-position valves hereinbefore identified, the valve element of valve 196 is spring-biased to a normal (right-hand) position and shifted to an activated (left-hand) position by the pressure in the control chamber. Valve 196 is accordingly shifted to its activated position, with no immediate result, except to establish a communication from a valve 200 to a valve 204 for a purpose later explained. After passing through double check valve 198, compressed air from line 220 also flows through the lower port of a double check valve 230 to a juncture 221, where the flow divides. One part of the flow goes to the control chambers at the right-hand end of two time delay valves 200 and 202. These valves are similar to the time delay valves 173 and 211, herebefore described, having built-in check valve and choke devices 200a and 202a, respectively, shown separately. Since no immediate response occurs, further operation of valves 200 and 202 will be later described.

From the juncture 221, another part of compressed air flows via a line 222 to the control chamber at the right-hand end of valve 180, thereby shifting the valve element thereof to its activated (left-hand) position. In its activated position, valve 180 cuts off the supply of compressed air to the right-hand end of valve 182 and vents the compressed air therefrom. Valve 182 is thus automatically restored to its normal position in which compressed air is supplied to the brake 30 and released from the clutch 25. Accordingly, the brake is applied to the spindle 16 and the clutch 25 disengaged, with the result that the rotation of spindle 16 is promptly stopped.

Concurrently with the stoppage of rotation of the spindle 16, compressed air from line 222 flows serially through the upper port of double check valve 170 and through the lower port of double check valve 172 to the control chamber of the pilot regulator 174. Since the pressure of the compressed air from line 127, as determined by the regulator 126a is much higher, for example 100 lbs. p.s.i., than the heat-up pressure (50 lbs. p.s.i.) it will be seen that the pilot regulator 174 supplies a correspondingly higher pressure to the cylinder 106 to effect a welding or forging pressure of the threaded rod 79 on the bolt stub 118.

Also concurrently with the stopping of the rotation of the spindle 16, the compressed air in line 222 shifts the valve element of valve 210 to its activated (left-hand) position. In such position, valve 210 connects line 197, charged with compressed air from lines 127 and 127a via valve 218 held in its activated position to line 222, thus establishing a "self-holding" communication for holding valve 210 in its activated position and maintaining the so-called forging pressure of 100 lbs. p.s.i. effective in the control chamber of pilot regulator 174.

The time-delay valves 200 and 202 are two-position valves, spring biased to a normal (right-hand) position and shifted to activated position by pressure of compressed air acting in a control chamber at the right hand end thereof. Also the built-in check valve and choke devices 200a and 202a for the valves 200 and 202 provide a time delay period respectively indicated as T-2 and T-3 on the valves.

The timing operation of valves 200 and 202 begins at the instant the solenoid valve 194 is actuated responsively to the signal from scanner 122. Assuming that the pre-set temperature as read by the scanner 122 endures for a length of time and then reduces below the pre-set temperature within the period of the time delay T-2 of valve 200, the pick-up signal from the scanner will terminate and thus solenoid valve 194 will be de-energized. In such case, the compressed air will be vented by valve 194 to atmosphere from line 220. Thus valve 196 will be restored to its normal position by release of activating compressed air from the right end thereof via return flow past check valve 198. However, upon the expiration of the delay time T-3 for valve 202, valve 202 is shifted to its activated position in which compressed air is supplied from line 127 to the right-hand end of valve 166. Valve 166 is thus shifted to its activated (left-hand) position in which the supply of compressed air to the right-hand end of directional valve 168 is cut off and vented to atmosphere while compressed air is at the same time supplied to the left-hand end of the directional valve 168.

With the directional valve 168 thus shifted to its right-hand position, compressed air is vented from the right-hand end of cylinder 106 and compressed air is supplied to the left-hand end of the cylinder 106. The carriage 68 is thereupon returned to its "back release" position. In its traverse toward the "back release" position the toggle valves 186 and 178 are restored to their de-activated positions.

In consequence of restoration to its normal position, valve 178 causes activating air pressure to be released from valves 212, 218, 217 and also cuts off the supply of compressed air (via valve 166) to the left-hand end of directional valve 168. Valve 168 thus returns promptly to its centered position in which the compressed air is released from the left-hand end of cylinder 106 so that the cylinder 106 and carriage are stopped in their "back release" position.

The deactivation of valve 212 results in the venting of compressed air from the bellows 80, thereby releasing the clamping levers 74 holding the threaded rod 79. Since the chuck 20 has already been unlocked, it is thus now possible for the operator to remove the threaded rod and the bolt-stud, now welded together, from the carriage 68. It will be seen that the jaws 34 of chuck 20 swivel to allow the bolt head to be removed therefrom.

Deactivation of valve 218 cuts off the supply of compressed air to line 222 holding valve 210 activated. Air pressure supplied from line 222 via double check valves 170 and 172 to the control chamber of pilot regulator 174 is thus vented at valve 210. Compressed air is also thereby released at valve 210 from the control chambers at the right-hand end of valves 200 and 202.

Deactivation of valve 217 cuts off the supply of compressed air from line 201 to the right-hand end of valve 211 and vents the air pressure therefrom to restore valve 211 to its deactivated position. In its deactivated position, valve 211 accordingly vents the activating air pressure from line 226.

Valves 200 and 202 are restored to their deactivated positions upon venting of line 222 as before described. Venting of line 222 also restores valve 180 to its deactivated position. However since line 193a is already vented at valve 178, valve 182 remains in its deactivated position, in which the clutch 25 is disengaged and the brake 30 on the spindle is applied.

The apparatus functions to indicate a faulty condition of the weld in the following manner. Let it be supposed that the scanner 122 registers a pre-set temperature so as to maintain a signal to pick-up solenoid valve 194 for a time period longer than the delay time T-2. In such case valve 200 is shifted to its activated position upon the expiration of the delay time T-2 and causes compressed air to be supplied from line 127 through valve 196 (now in its activated position) to the left-hand end of valve 204. Valve 204 has a floating valve element which remains in a right-hand or a left-hand position depending upon the direction in which the activating pressure, last effective, exerted a force.

Valve 204 is thus effective in its right-hand position to cut off the supply of compressed air from line 127 to the start valve 154 and supply compressed air to a line 225 leading to a pressure actuated "fault" signal lamp 214 to cause the lamp to register the fault condition. Also compressed air from line 225 flows to the lower port of the double check valve 219 and thus activates valve 212 to supply compressed air, via regulator 195 to the bellows 80. In such case, the clamping levers 94 hold the threaded rod 79 at the conclusion of the welding operation and, unless they are released by an over-riding manual operation, now to be described, the welded parts cannot be removed from the carriage 68.

In order to release the clamping levers 74 and extinguish the signal lamp 214 after the occurrence of a faulty welding operation as just described, a so-called "open clamp" valve 213 is provided. Valve 213 has a two-position valve element activated by manually applied pressure to cause the supply of compressed air from line 127 and branch line 127b to the right-hand end of valve 204. Valve 204 is thus activated to its left-hand position in which compressed air is vented from line 225 and a connection reestablished to the start valve 154. With the venting of compressed air from the bellows 80 and from the "fault" signal lamp 214, the clamping levers 74 are freed to permit removal of the welded parts and the signal lamp 214 is extinguished.

Now let it be assumed, further, that the appropriate pre-set welding temperature is never attained and that during the operation cycle the scanner 122 does not register the pre-set temperature and provide an energizing signal to solenoid valve 194 within the time delay period T-5 of valve 211. In such case, valve 194 does not provide an activating pressure for valves 200 and 202 and, at the same time, valve 211 is shifted to its activated position at the expiration of the time delay period T-5. In its activated position, valve 211 supplies compressed air from line 127 to a line 226 leading to the upper port of double check valve 198, through which compressed air flows to activate the two valves 200 and 202 as well as to activate valve 196.

Valve 202, upon expiration of its delay time T-3 supplies compressed air to valve 166 to cause actuation of directional valve 168 to return the carriage 68 back to back release position.

Valve 200, upon expiration of its delay time T-2, supplies compressed air to activated valve 196, through which the compressed air flows to the left-hand end of valve 204. Valve 204 is thus activated to supply compressed air to line 225, thereby causing activation of signal lamp 214 and activating valve 212 to supply compressed air to inflate bellows 80.

It will thus be seen that when the proper welding temperature is never attained during the operation cycle, the signal lamp 214 is lighted and the levers 74 are maintained in clamped position. The manual over-ride valve 213 may be operated, in this case, as before described to restore valve 204 to its left-hand position, thereby causing the signal lamp 214 to be extinguished and the bellows 80 to be deflated to free the clamping levers 74 from their clamping position.

It will be apparent that the above described method and apparatus is particularly suited and adapted for welding bolt stubs of the tension indicating type to threaded rods by reason of the close surveillance maintained over the welding temperature. Moreover, by reason of the fact that faulty welds are immediately "flagged" by the "fault" signal and by the fact that the welded parts cannot be removed from the apparatus without a special manual over-ride operation, the possibility of having a faulty end product under service conditions is remote.

We claim:

1. The method of friction welding of two members comprising the steps of:
    (a) rotating one member relative to the other while exerting a first relatively low contact pressure therebetween to provide true mating interface surfaces,
    (b) rotating the one member relative to the other member while exerting a second and relatively higher contact pressure therebetween to build up heat in said members in a zone adjacent the interface surfaces of said members to enable welding said members together,
    (c) measuring the build-up of heat in said zone in terms of temperature during a first predetermined time and thereafter measuring the temperature in said zone during a second predetermined time commencing upon the attainment of a temperature in said zone appropriate for an acceptable weld,
    (d) stopping rotation of said one member relative to the other upon attainment of a temperature in said zone appropriate for an acceptable weld,
    (e) then exerting a third and further increased contact pressure between said members to effect welding of said members together,
    (f) effecting a fault indication when the temperature in said zone does not reach that appropriate for an acceptable weld during the first predetermined time, and also
    (g) effecting a fault indication when a temperature of at least that appropriate for an acceptable weld endures in said zone for a period longer than said second predetermined time.

2. The method of friction welding of two members comprising the steps of:
   (a) rotating one member relative to the other while exerting a first relatively low contact pressure therebetween to provide true mating interface surfaces,
   (b) rotating the one member relative to the other member while exerting a second and relatively higher contact pressure therebetween to build up heat in said members in a zone adjacent the interface surfaces of said members to enable welding said members together,
   (c) measuring the build-up of heat in said zone in terms of temperature during a first predetermined time and thereafter measuring the temperature in said zone during a second predetermined time commencing upon the attainment of a temperature in said zone appropriate for an acceptable weld,
   (d) stopping rotation of said one member relative to the other upon attainment of a temperature in said zone appropriate for an acceptable weld,
   (e) then exerting a third and further increased contact pressure between said members to effect welding of said members together, and
   (f) effecting a fault indication when the temperature in said zone does not reach that appropriate for an acceptable weld during the first predetermined time.

3. The method of friction welding of two members comprising the steps of:
   (a) rotating one member relative to the other while exerting a first relatively low contact pressure therebetween to provide true mating interface surfaces,
   (b) rotating the one member relative to the other member while exerting a second and relatively higher contact pressure therebetween to build-up heat in said members in a zone adjacent the interface surfaces of said members to enable welding said members together,
   (c) measuring the build-up of heat in said zone in terms of temperature during a first predetermined time and thereafter measuring the temperature in said zone during a second predetermined time commencing upon the attainment of a temperature in said zone appropriate for an acceptable weld,
   (d) stopping rotation of said one member relative to the other upon attainment of a temperature in said zone appropriate for an acceptable weld,
   (e) then exerting a third and further increased contact pressure between said members to effect welding of said members together, and
   (f) effecting a fault indication when a temperature of at least that appropriate for an acceptable weld endures in said zone for a period longer than said second predetermined time.

4. In friction welding apparatus of the type having means for rotating one member relative to another while exerting a first relatively low contact pressure therebetween to provide true mating interface surfaces and continuing to rotate said one member relative to the other while exerting a second and relatively higher contact pressure therebetween to build-up heat in said members in a zone adjacent the interface surfaces of said members to enable welding said members together, the improvement comprising:
   (a) means for measuring the build-up of heat in said zone in terms of temperature during a first predetermined time and thereafter measuring the temperature in said zone during a second predetermined time commencing upon the attainment in said zone of a temperature appropriate for an acceptable weld,
   (b) means for stopping the rotation of said one member relative to the other upon the attainment of a temperature in said zone appropriate for an acceptable weld,
   (c) means for exerting a third and further increased contact pressure between said members to effect welding of said members together upon attainment of a temperature in said zone appropriate for an acceptable weld,
   (d) means for effecting a fault indication when the temperature in said zone does not attain that appropriate for an acceptable weld during the first predetermined time, and
   (e) means for effecting a fault indication when a temperature in said zone of at least that appropriate for an acceptable weld endures longer than said second predetermined time.

5. In friction welding apparatus of the type having means for rotating one member relative to another while exerting a first relatively low contact pressure therebetween to provide true mating interface surfaces and continuing to rotate said one member relative to the other while exerting a second and relatively higher contact pressure therebetween to build-up heat in said members in a zone adjacent the interface surfaces of said members to enable welding said members together, the improvement comprising:
   (a) means for measuring the build-up of heat in said zone in terms of temperature during a first predetermined time and thereafter measuring the temperature in said zone during a second predetermined time commencing upon the attainment in said zone of a temperature appropriate for an acceptable weld,
   (b) means for stopping the rotation of said one member relative to the other upon the attainment of a temperature in said zone appropriate for an acceptable weld,
   (c) means for exerting a third and further increased contact pressure between said members to effect welding of said members together upon attainment of a temperature in said zone appropriate for an acceptable weld, and
   (d) means for effecting a fault indication when the temperature in said zone does not attain that appropriate for an acceptable weld during the first predetermined time.

6. In friction welding apparatus of the type having means for rotating one member relative to another while exerting a first relatively low contact pressure therebetween to provide true mating interface surfaces, and continuing to rotate said one member relative to the other while exerting a second and relatively higher contact pressure therebetween to build-up heat in said members in a zone adjacent the interface surfaces of said members to enable welding said members together, the improvement comprising:
   (a) means for measuring the build-up of heat in said zone in terms of temperature during a first predetermined time and thereafter measuring the temperature in said zone during a second predetermined time commencing upon the attainment in said zone of a temperature appropriate for an acceptable weld, (b) means for stopping the rotation of said one member relative to the other upon the attainment of a temperature in said zone appropriate for an acceptable weld, (c) means for exerting a third and further increased contact pressure between said members to effect welding of said members together upon attainment of a temperature in said zone appropriate for an acceptable weld, and (d) means for effecting a fault indication when a temperature in said zone of at least that appropriate for an acceptable weld endures longer than said second predetermined time.

7. In a friction welding apparatus according to claim 4, wherein the means recited in clause (c) comprises means controlled by said temperature measuring means.

8. In a friction welding apparatus according to claim 5, wherein the means recited in clause (c) comprises means controlled by said temperature measuring means.

9. In a friction welding apparatus according to claim 6, wherein the means recited in clause (c) comprises means controlled by said temperature measuring means.

10. The method of friction welding of two members according to claim 1, wherein the effecting of a fault indication includes the step of preventing removal of the members from their respective positions occupied during the welding process.

11. The method of friction welding of two members according to claim 1 wherein the effecting of a fault indication includes a step of preventing removal of the members from their respective positions occupied during the welding process and the additional step including a manual override of the fault indication.

12. The method of assuring a satisfactory quality of weld between two members in a friction welding process wherein at least one of the members is rotated relative to the other while pressed together under pressure to generate heat in a zone adjacent the interface surfaces of the two members, comprising the steps of:

(a) constantly measuring the temperature in the said zone, (b) further increasing the pressure with which said members are pressed together when the said temperature in the said zone attains a predetermined temperature to effect the welding together thereof, and (c) providing a fault indication in the event that the temperature at the said zone continues to exceed said predetermined temperature for a period longer than a predetermined interval of time following inception thereof.

13. The method according to claim 12, wherein the step of providing a fault indication includes preventing removal of the members from the position occupied thereby during the welding process except by a manual override step.

14. Friction welding apparatus for creating a welding temperature by rotating one of two members to be welded together relative to the other while exerting a force pressing the members into frictional contact to generate heat at the interface zone of the two members appropriate for welding, and then increase the force to effect welding, wherein the improvement comprises a rotary spindle having a chuck for releasably holding one of two members to be welded, power means for rotating said spindle, a carriage for supporting the other of two members, a clamping device on said carriage operative to clamp said other of two members against movement relative to the carriage, fluid power means for moving said carriage reciprocably with respect to said spindle, means controlling said fluid power means to effect movement of said other of the two members coaxially into frictional contact with said one member while said spindle is being rotated to generate heat at the interface zone of the two members, means controlled by movement of said carriage toward said spindle for activating said clamping device into a position clamping said other member in a fixed position on said carriage.

15. Friction welding apparatus according to claim 14, wherein means controlled by return movement of said carriage toward said starting position is effective to activate said clamping device from the said closed position to its open position.

16. Friction welding apparatus according to claim 15, further comprising means for signalling a fault condition responsively to the duration of a predetermined temperature at the interface zone for a time period longer than a predetermined fixed period of time following the initial occurrence of said predetermined temperature.

17. Friction welding apparatus according to claim 14, wherein means controlled by return movement of said carriage toward said starting position is effective to activate said clamping device from said closed position to its open position, and wherein means is provided for signalling a fault condition, including means for nullifying the effect of the said movement controlled means in response to return movement of the carriage and for preventing activation of said clamping device to its open position.

18. Friction welding apparatus according to claim 14, wherein means controlled by return movement of said carriage toward said starting position is effective to activate said clamping device from said closed position to its open position, and further comprising means for signalling a fault condition, including means for nullifying the effect of the said movement controlled means in response to return movement of the carriage and preventing activation of said clamping device to its open position, and manually operable override means for effecting return of said clamping device to its open position notwithstanding nullification by the last said means.

19. Friction welding apparatus according to claim 14, further comprising means for locking said chuck in a closed position holding said one member against removal therefrom during the forging operation, and means for nullifying said locking means to enable removal of said one member therefrom at the conclusion of the forging operation.

20. Friction welding apparatus according to claim 14, further comprising clutch means for connecting said power means in driving relation to said spindle, and brake means for exerting a braking force on said spindle, and wherein means controlled by movement of said carriage controls said clutch means and said brake means to initiate rotation of said rotary spindle, and means responsive to attainment of a predetermined temperature at the interface zone controls said clutch means and said brake means to cause cessation of rotation of said spindle.

* * * * *

UNITED STATES PATENT OFFICE
CERTIFICATE OF CORRECTION

Patent No. 4,087,036          Dated   May 2, 1978

Inventor(s)  David A. Corbett and Frederick E. Clark

It is certified that error appears in the above-identified patent and that said Letters Patent are hereby corrected as shown below:

Column 7, line 53, "194" should be --193a--.

Signed and Sealed this

Third Day of October 1978

[SEAL]

Attest:

RUTH C. MASON
Attesting Officer

DONALD W. BANNER
Commissioner of Patents and Trademarks